United States Patent
Fujishima

(10) Patent No.: US 8,515,266 B2
(45) Date of Patent: Aug. 20, 2013

(54) IMAGE REPRODUCING APPARATUS

(75) Inventor: Yoshikazu Fujishima, Daito (JP)

(73) Assignee: Funai Electric Co., Ltd., Osaka (JP)

(*) Notice: Subject to any disclaimer, the term of this patent is extended or adjusted under 35 U.S.C. 154(b) by 227 days.

(21) Appl. No.: 13/187,911

(22) Filed: Jul. 21, 2011

(65) Prior Publication Data

US 2012/0027386 A1    Feb. 2, 2012

(30) Foreign Application Priority Data

Jul. 29, 2010   (JP) .................................. 2010-170946

(51) Int. Cl.
*H04N 5/77*    (2006.01)

(52) U.S. Cl.
USPC ......................................................... 386/360

(58) Field of Classification Search
USPC ................................. 386/200, 360
See application file for complete search history.

(56) References Cited

U.S. PATENT DOCUMENTS

| 2006/0269219 | A1* | 11/2006 | Nishitani ................. 386/46 |
| 2007/0029882 | A1  | 2/2007  | Watanabe |
| 2008/0260360 | A1  | 10/2008 | Fujishima |

FOREIGN PATENT DOCUMENTS

| JP | 2007-041850 | 2/2007 |
| JP | 2008-270991 | 11/2008 |

* cited by examiner

*Primary Examiner* — Huy T Nguyen
(74) *Attorney, Agent, or Firm* — Morgan, Lewis & Bockius LLP

(57) ABSTRACT

An image reproducing apparatus is an apparatus in which a BD player and a VC player are integral with each other. The image reproducing apparatus includes a panel switch unit for operating the BD player and the VC player, a mode set switch for selecting a BD reproduction mode or a VC reproduction mode, a sub microcomputer for controlling the operation of the BD player, and a VCP microcomputer for controlling the operation of the VC player. The sub microcomputer includes a DA converter which converts the digital signals into analog signals so as to transmit the converted analog signals to the VCP microcomputer when determined to be the VCP reproduction mode. The VCP microcomputer includes an AD converter which converts the analog signals transmitted from the DA converter into digital signals and a reproduction control unit which starts the operation of the VCP based on the converted digital signals.

2 Claims, 4 Drawing Sheets

IMAGE REPRODUCING APPARATUS

BACKGROUND OF THE INVENTION

1. Field of the Invention

The present invention relates to an image reproducing apparatus which reproduces an image using BD (Blu-ray Disc) and VC (Video Cassette).

2. Description of the Related Art

Conventionally, there is a known image reproducing apparatus provided with two types of image reproducing functions such as a BD reproducing function and a VC reproducing function, for example. As an example of the above known image reproducing apparatus, FIG. 4A shows a front view of an image reproducing apparatus 40 which is provided with a panel switch unit 41a for a VC at the right side of a VC insertion slot 41 and a panel switch unit 42a for a BD at the right side of a BD insertion slot 42.

As shown in FIG. 4B, the image reproducing apparatus 40 includes not only a VCP (Video Cassette Player) microcomputer 43 which is connected to the panel switch unit 41a of a VC reproducing unit but also a sub microcomputer 44 which is connected to the panel switch unit 42a of a BD reproducing unit. The VCP microcomputer 43 and the sub microcomputer 44 receive operation signals according to a switch operated by a user from the panel switch units 41a and 42a, respectively, and control a reproduction and recording operation of the BD or the VC.

There is a known electronic apparatus in which a sub microcomputer controls a power supply to a main microcomputer and a peripheral device and a power control method by the sub microcomputer is changed (refer to Japanese Laid-Open Patent Publication No. 2007-41850, for example). There is also a disclosure of a video recording apparatus which configures a VCR (Video Cassette Recorder) recording unit based on a configuration data received from a main microcomputer using the same sub microcomputer regardless of whether or not a VCR microcomputer is connected to the sub microcomputer (refer to Japanese Laid-Open Patent Publication No. 2008-270991, for example).

However, in the above conventional image reproducing apparatus having a reproducing function of several types of recording media, as shown in FIGS. 4A and 4B, the panel switch units 41a and 42a are normally provided for the BD and VC separately, and the image reproducing apparatus receives the operation signals corresponding to the button operated by the user from the panel switch units 41a and 42a so as to operate in accordance with the operation signals. Thus, in the conventional image reproducing apparatus having the reproducing function of several types of recording media, the separate panel switch units are required in accordance with the type of recording medium. This increases the number of panel switch units.

SUMMARY OF THE INVENTION

The present invention is to solve the problem described above, and an object of the present invention is to provide an image reproducing apparatus having a reproducing function of several types of recording media in which panel switch units are commonalized without changing a function of a conventional control means such as a conventional VCP microcomputer so that the number of panel switch units is reduced.

According to an aspect of the present invention, this object is achieved by an image reproducing apparatus in which a first image reproducing unit for reproducing an image recorded in a first recording medium, and a second image reproducing unit for reproducing an image recorded in a second recording medium, are integral with each other.

The image reproducing apparatus comprises: a panel switch unit for operating the first image reproducing unit and the second image reproducing unit; a mode selection means for selecting a first recording medium reproduction mode or a second recording medium reproduction mode; a first control means for controlling the operation of the first image reproducing unit; and a second control means for controlling the operation of the second image reproducing unit.

The first control means includes an AD converting means for converting analog signals, which are operation signals received from the panel switch unit, into digital signals, a mode determination means for determining the mode selected by the mode selection means when receiving the operation signals from the panel switch unit, and a DA converting means for converting the operation signals of digital signal format converted by the AD converting means into operation signals of analog signal format so as to transmit the operation signals of analog signal format to the second control means.

The first control means starts the operation of the first image reproduction unit based on the operation signals converted by the AD converting means when the mode determination means determines that the first recording medium reproduction mode is selected, and transmits the operation signals of analog signal format from the DA converting means to the second control means when the mode determination means determines that the second recording medium reproduction mode is selected.

The second control means has a second AD converting means for converting the operation signals of analog signal format transmitted from the DA converting means into operation signals of digital signal format.

The second control means starts the operation of the second image reproduction unit based on the operation signals of digital signal format converted by the second AD converting means.

According to the above configuration, when receiving the operation signals from the panel switch unit, the first control means determines whether the selected mode is the first recording medium reproduction mode or the second recording medium reproduction mode by using the mode determination means. Then, when determining that the first recording medium reproduction mode is selected, the first control means starts the operation of the first image reproducing unit. In contrast, when determining that the second recording medium reproduction mode is selected, the first control means transmits the operation signals of analog signal format to the second control means. Consequently, according to the image reproducing apparatus of the present invention, the panel switch units for the first image reproducing unit and the second image reproducing unit are commonalized without changing a function of the second control means such as a conventional VCP microcomputer so that the number of panel switch units is reduced.

The first recording medium is Blu-ray Disc and the second recording medium is Video Cassette.

BRIEF DESCRIPTION OF THE DRAWINGS

The present invention will be described below with reference to the annexed drawings. It is to be noted that all drawings are shown for the purpose of illustrating the technical concept of the present invention or embodiments thereof, wherein.

DESCRIPTION OF THE PREFERRED EMBODIMENTS

An image reproducing apparatus according to a preferred embodiment of the present invention is described with reference to FIGS. 1A to 3. The image reproducing apparatus according to the present embodiment is an apparatus in which not only a BD player (claimed first image reproducing unit) for reproducing an image recorded in BD (Blu-ray Disc) (claimed first recording medium) but also a VC player (claimed second image reproducing unit) for reproducing an image recorded in VC (Video Cassette) (claimed second recording medium) are integral with each other.

Figure 1A:
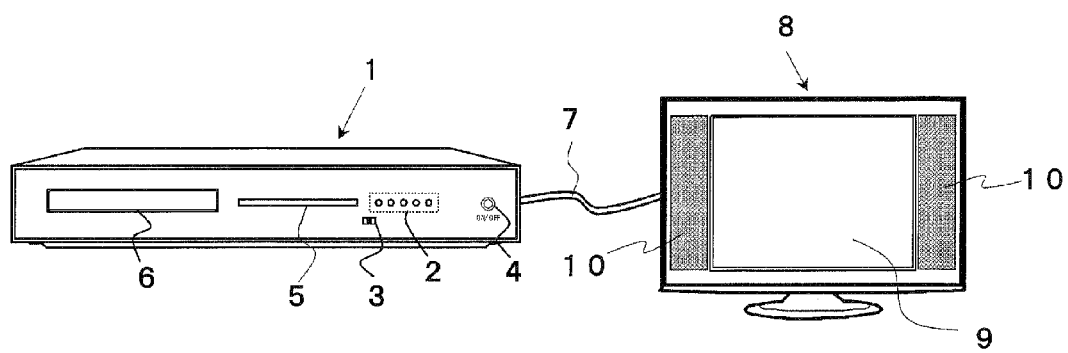
FIG. 1A is a front view of an image reproducing apparatus according to a preferred embodiment of the present invention.

As shown in FIG. 1A, an image reproducing apparatus 1 is an equipment which can reproduce an image recorded in BD and VC (Video Cassette), and image signals and sound signals which are reproduced by the image reproducing apparatus 1 are outputted to a TV (television) receiver 8 via a HDMI (High Definition Multimedia Interface) cable 7. The image reproducing apparatus 1 and the TV receiver 8 are equipments which support CEC (Consumer Electronic Control), which is a function for a mutual control of apparatuses in HDMI standard. The TV receiver 8 displays an image recorded in the BD and VC on a display 9 and outputs a sound from a speaker 10.

A panel switch unit 2, a mode set switch (mode selection means) 3, a power button 4, a BD insertion slot 5, and a VC insertion slot 6 are provided on a front surface of the image reproducing apparatus 1. The panel switch unit 2 is composed of operation switches which are pressed by a user to reproduce, record, stop, pause, fast-forward, fast-wind, and so on the BD or the VC. Only one panel switch unit 2 is provided on the front surface of the image reproducing apparatus 1.

The mode set switch 3, which is a button, is set to right or left by the user to select manually a VC/BD reproduction mode. The VC/BD reproduction mode is not necessarily selected by the mode set switch 3, but may be selected by a remote controller.

The power button 4 is used for turning the power ON/OFF. The BD insertion slot 5 is an opening through which the user inserts the BD into a disc drive, and the VC insertion slot 6 is an opening through which the user inserts the VC into a drive unit.

Figure 1B:
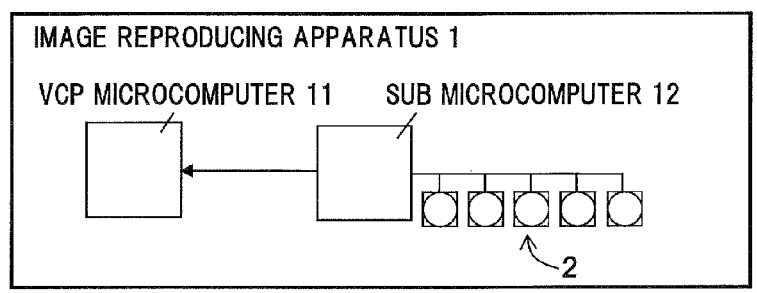
FIG. 1B is an electrical block diagram of a panel switch unit and microcomputers of the image reproducing apparatus in FIG. 1A.

As shown in FIG. 1B, respective switches in the panel switch unit 2 is connected to a sub microcomputer (first control means) 12 which controls the BD reproduction, and the sub microcomputer 12 is connected to a VCP (Video Cassette Player) microcomputer (second control means) 11 which controls the VCP reproduction.

Figure 2:
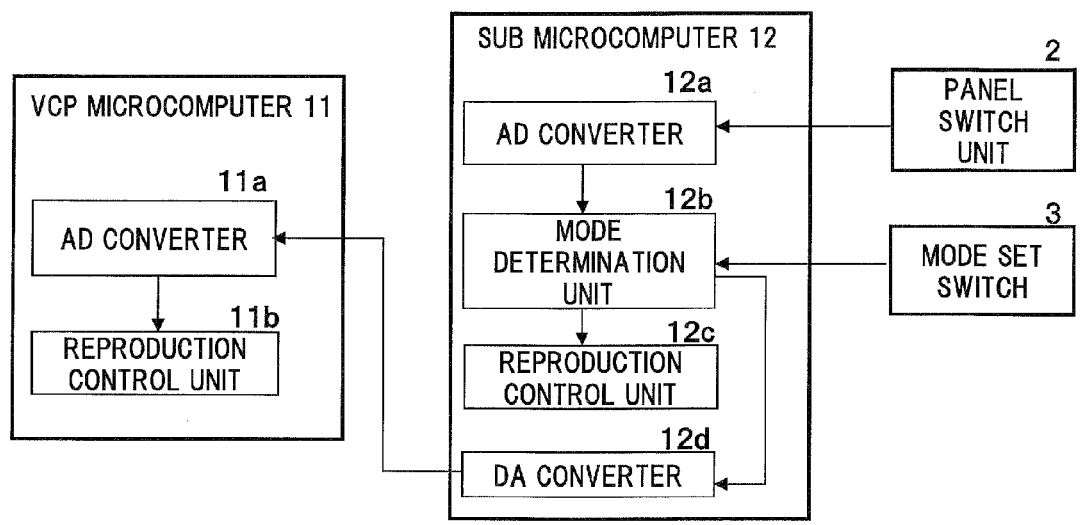
FIG. 2 is a functional block diagram of a VCP microcomputer and a sub microcomputer of the image reproducing apparatus in FIG. 1A.

Next, with reference to FIG. 2, a functional configuration of the image reproducing apparatus 1 according to the present preferred embodiment is described hereinafter. The sub microcomputer 12, which is the microcomputer for BD, includes a CPU, a memory, a communication interface, and so on, and controls the whole operation for the BD reproduction. In the present preferred embodiment, the sub microcomputer 12 includes an AD converter 12a, a mode determination unit 12b, a reproduction control unit 12c, and a DA converter 12d.

The AD converter 12a receives an analog waveform voltage corresponding to the respective operations of the switches from the respective switches in the panel switch unit 2 and converts the analog waveform voltage into digital signals. The AD converter 12a transmits the digital signals to the mode determination unit 12b.

The mode determination unit 12b determines whether the mode set switch 3 is set to the BD reproduction mode or the VC reproduction mode based on ON/OFF state of an electrical circuit, for example. When determined to be the BD reproduction mode, the mode determination unit 12b transmits operation signals of digital signal format, which are transmitted from the AD converter 12a, to the reproduction control unit 12c. In contrast, when determined to be the VC reproduction mode, the mode determination unit 12b transmits operation signals of digital signal format, which are transmitted from the AD converter 12a, to the DA converter 12d.

The reproduction control unit 12c determines the operation switch pressed by the user based on the digital signals received from the AD converter 12a via the mode determination unit 12b and starts controlling the image reproducing apparatus 1. When the reproduction switch is pressed, the reproduction control unit 12c operates the disk drive which is built into the image reproducing apparatus 1 to transmit a laser beam from an optical pick up onto an optical disk and obtains the image and sound as electrical signals from a reflected light. Subsequently, the reproduction control unit 12c controls the reproduction of the optical disk by performing an image signal output process based on the obtained electrical signals so as to display the image on the display 9 which is connected to the image reproducing apparatus 1.

When receiving the operation signals of digital signal format from the mode determination unit 12b, the DA converter 12d reconverts the received operation signals into operation signals of analog signal format and transmits the reconverted analog signals to an AD converter 11a in the VCP microcomputer 11.

The VCP microcomputer 11 used for the VC reproduction has the conventional configuration without modification. The VCP microcomputer 11 includes a CPU, a memory, an I/O unit, and so on, and controls the whole operation for the VC reproduction. In the present preferred embodiment, the VCP microcomputer 11 includes the AD converter 11a and a reproduction control unit 11b. The reproduction control unit 11b starts a reproduction process of the VC based on the digital signals received from the AD converter 11a.

Thus, in the image reproducing apparatus 1 according to the present preferred embodiment, the sub microcomputer 12 receives all of the input signals from the panel switch unit 2, and when determined to be the VC reproduction mode for reproducing the VC in the mode determination unit 12b, operation signals of analog waveform are outputted from the DA converter 12d in the sub microcomputer 12 to the AD converter 11a which is a switch input port of the VCP microcomputer 11. When the VCP microcomputer 11 receives the operation signals of analog signal format, the VCP microcomputer 11 recognizes that the switch in the panel switch unit 2 is pressed in the VC reproduction mode and thereby can start its operation.

Figure 3:
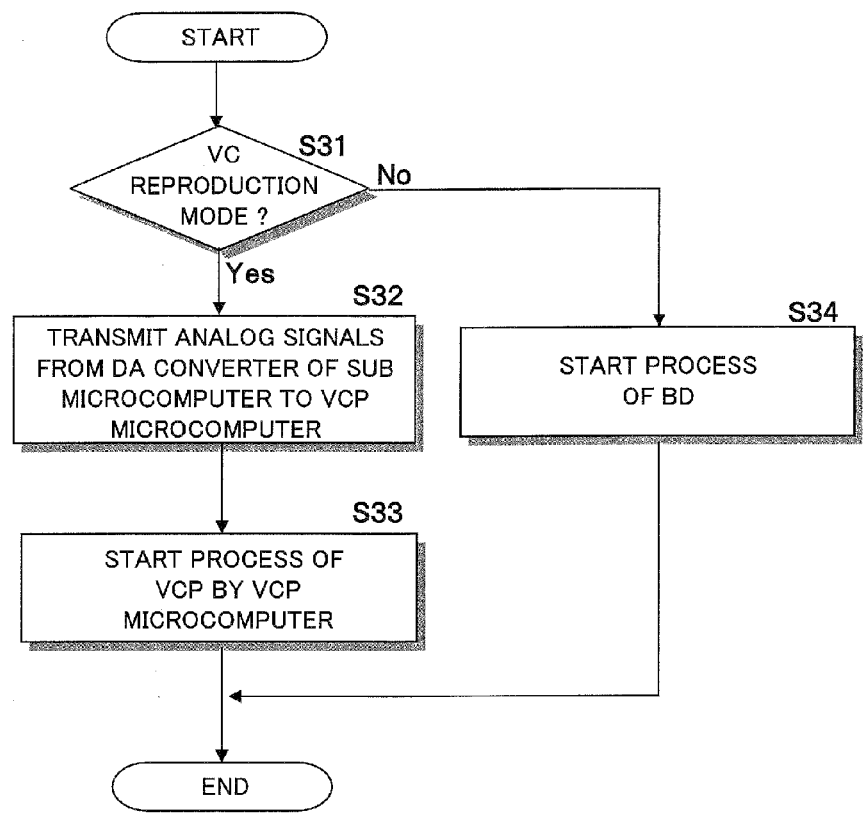
FIG. 3 is a flow chart illustrating an operation process of the image reproducing apparatus in FIG. 1A.
Figure 4A:
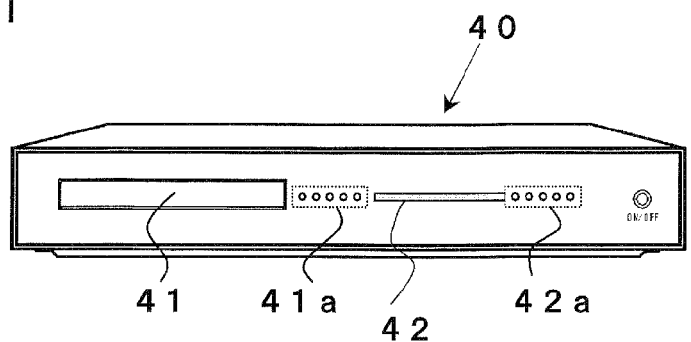
FIG. 4A is a front view of a conventional image reproducing apparatus.
Figure 4B:
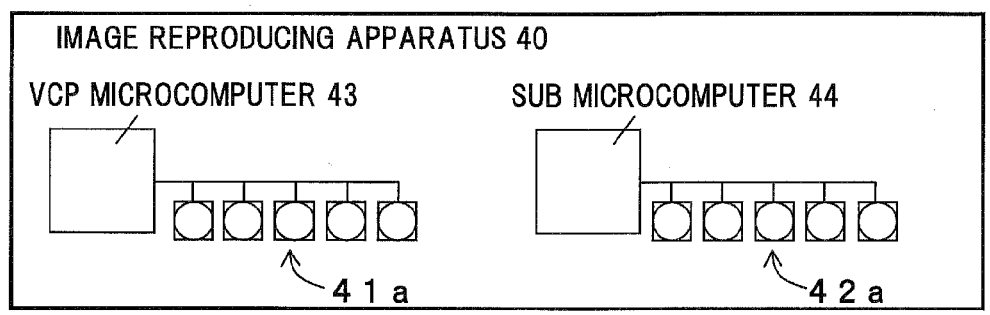
FIG. 4B is an electrical block diagram of panel switch units and microcomputers of the conventional image reproducing apparatus in FIG. 4A.

Next, an operation of the image reproducing apparatus 1 according to the present preferred embodiment is described hereinafter. Firstly, as shown in FIG. 3, the mode determination unit 12b in the sub microcomputer 12 determines whether the current reproduction mode is the BD reproduction mode or the VC reproduction mode based on the setting of the mode set switch 3 (S31). When determined to be the BD reproduction mode (No in S31), the reproduction control unit 12c in the sub microcomputer 12 starts the process on the BD (the operation to reproduce, record, stop, pause, fast-forward, fast-wind, and so on) in accordance with the pressed switch based on the operation signals of digital signal format received from the AD converter 12a (S34).

In contrast, when determined to be the VC reproduction mode (Yes in S31), the DA converter 12d in the sub microcomputer 12 outputs the operation signals of analog waveform (analog signal format), which are reconverted from the digital signals, to the AD converter 11a which is an input port of the VCP microcomputer 11 (S32). For example, when the reproduction switch in the panel switch unit 2 is pressed and the mode set switch 3 is set to be the VC reproduction mode, the sub microcomputer 12 outputs from the DA converter 12d to the VCP microcomputer 11 operation signals of analog waveform, which are similar to those output by the conventional VCP microcomputer 43 when the reproduction switch in the conventional panel switch unit is pressed.

Next, the AD converter 11a in the VCP microcomputer 11 receives the analog signals transmitted from the DA converter 12d and converts them into operation signals of digital signal format. The reproduction control unit 11b in the VCP microcomputer 11 starts a process of the VCP (the operation to reproduce, record, stop, pause, fast-forward, fast-wind, and so on) in accordance with the pressed switch based on the digital signals received from the AD converter 11a (S33).

As described above, according to the image reproducing apparatus 1 of the present preferred embodiment, the number of panel switch units can be reduced and the reproducing operation of the VCP can be controlled by using one panel switch unit 2 without changing the function of the VCP microcomputer 11 which is conventionally used. Thus, a development cost of the image reproducing apparatus 1 can be suppressed.

The present invention is not limited to the configuration of the above preferred embodiment, however, various modification are applicable within the scope of the invention. For example, the image reproducing apparatus 1 is not limited to the BD player and the VCP player, however, it can also be applied to a DVD (Digital Versatile Disc) player, a DVD recorder, or VCR (Video Cassette Recorder), for example. Moreover, in the above preferred embodiment, the sub microcomputer 12 is described as the microcomputer for controlling the BD reproduction, however, it is also applicable that the sub microcomputer is used as the microcomputer for controlling the VC and the VCP microcomputer 11 is changed to the microcomputer for controlling the BD reproduction. Furthermore, the VCP microcomputer 11 and the sub microcomputer 12 do not have to be made up as separate processors, however, the VCP microcomputer 11 and the sub microcomputer 12 can also be made up as one processor.

What is claimed is:

1. An image reproducing apparatus in which a first image reproducing unit for reproducing an image recorded in a first recording medium, and a second image reproducing unit for reproducing an image recorded in a second recording medium, are integral with each other, comprising:
 a panel switch unit for operating the first image reproducing unit and the second image reproducing unit;
 a mode selection means for selecting a first recording medium reproduction mode or a second recording medium reproduction mode;
 a first control means for controlling the operation of the first image reproducing unit; and
 a second control means for controlling the operation of the second image reproducing unit, wherein
 the first control means includes
 an AD converting means for converting analog signals, which are operation signals received from the panel switch unit, into digital signals,
 a mode determination means for determining the mode selected by the mode selection means when receiving the operation signals from the panel switch unit, and
 a DA converting means for converting the operation signals of digital signal format converted by the AD converting means into operation signals of analog signal format so as to transmit the operation signals of analog signal format to the second control means, and
 the first control means starts the operation of the first image reproduction unit based on the operation signals converted by the AD converting means when the mode determination means determines that the first recording medium reproduction mode is selected and
 the first control means transmits the operation signals of analog signal format from the DA converting means to the second control means when the mode determination means determines that the second recording medium reproduction mode is selected, and
 the second control means has a second AD converting means for converting the operation signals of analog signal format transmitted from the DA converting means into operation signals of digital signal format and
 the second control means starts the operation of the second image reproduction unit based on the operation signals of digital signal format converted by the second AD converting means.

2. The image reproducing apparatus according to claim 1, wherein the first recording medium is Blu-ray Disc and the second recording medium is Video Cassette.

* * * * *